Oct. 4, 1938.  D. H. GOODWILLIE  2,131,873
APPARATUS FOR BENDING GLASS
Filed July 5, 1934  2 Sheets-Sheet 1

Inventor
DAVID H. GOODWILLIE.
By Frank Fraser
Attorney

Oct. 4, 1938.   D. H. GOODWILLIE   2,131,873
APPARATUS FOR BENDING GLASS
Filed July 5, 1934   2 Sheets-Sheet 2

Inventor
DAVID H. GOODWILLIE.
By Frank Fraser
Attorney

Patented Oct. 4, 1938

2,131,873

UNITED STATES PATENT OFFICE 2,131,873

APPARATUS FOR BENDING GLASS

David H. Goodwillie, Toledo, Ohio, assignor to Libbey-Owens-Ford Glass Company, Toledo, Ohio, a corporation of Ohio Application July 5, 1934, Serial No. 733,741

4 Claims. (Cl. 49—7)

The present invention relates to an improved process and aparatus for bending glass and more particularly for the bending of flat sheets or plates of glass.

An important object of this invention is the provision of a process and apparatus of the above character wherein the bending of the glass sheets or plates may be performed in a substantially continuous manner, thereby reducing handling of the glass to a minimum and accelerating production.

Another important object of this invention is the provision of a process and apparatus of the above character by the practice and use of which glass sheets or plates can be accurately bent to a predetermined curvature in a thoroughly practical and efficient manner so as to reduce the liability of breakage of the glass and likewise minimize the setting up of stresses and strains therein during the bending operation.

According to the invention, there is provided a bending furnace or oven of substantially tunnel-like formation wherein a series of molds supporting the glass sheets or plates to be bent, commonly termed the blanks, are carried upon cars or trucks and moved progressively and preferably intermittently therethrough. The movement of the molds is effected in a direction longitudinally of the furnace and causes the blanks to pass successively through a plurality of zones of different temperatures which insures the proper heating, bending, and subsequent cooling of the said blanks.

Other objects and advantages of the invention will become more apparent during the course of the following description when taken in connection with the accompanying drawings.

Figure 1:
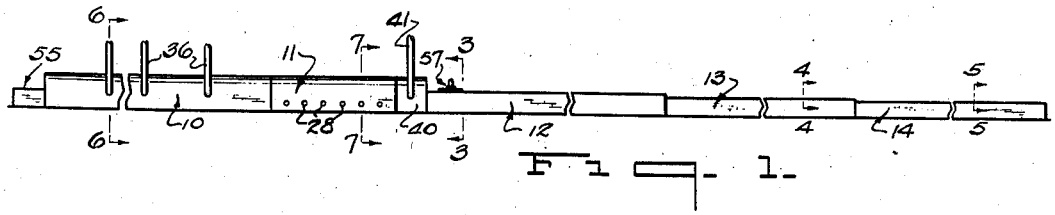
Figure 2:
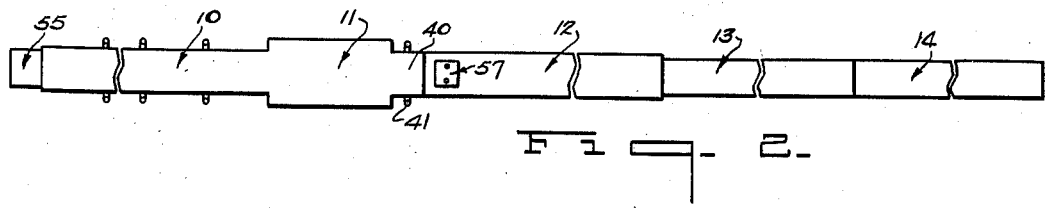
Figure 3:
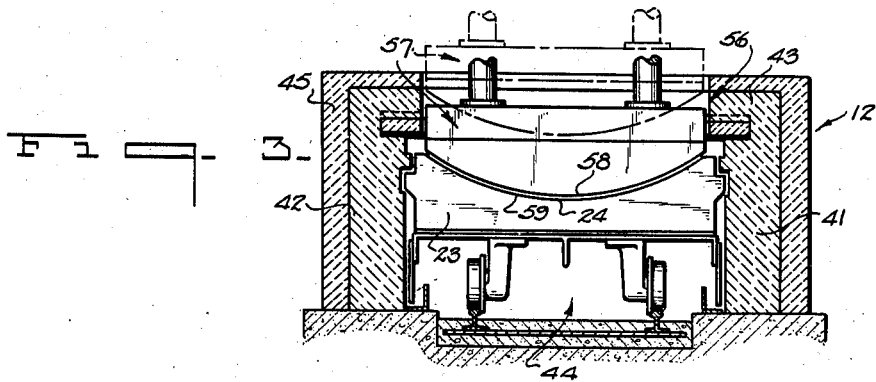
Figure 4:
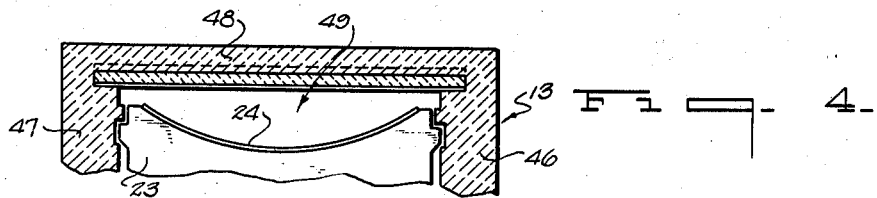
Figure 5:
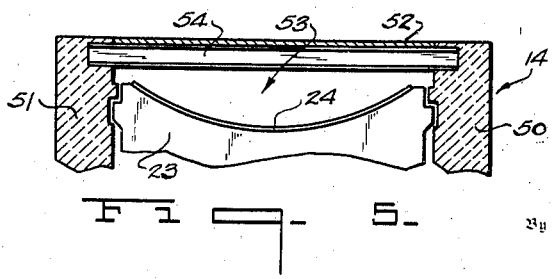
Figure 6:
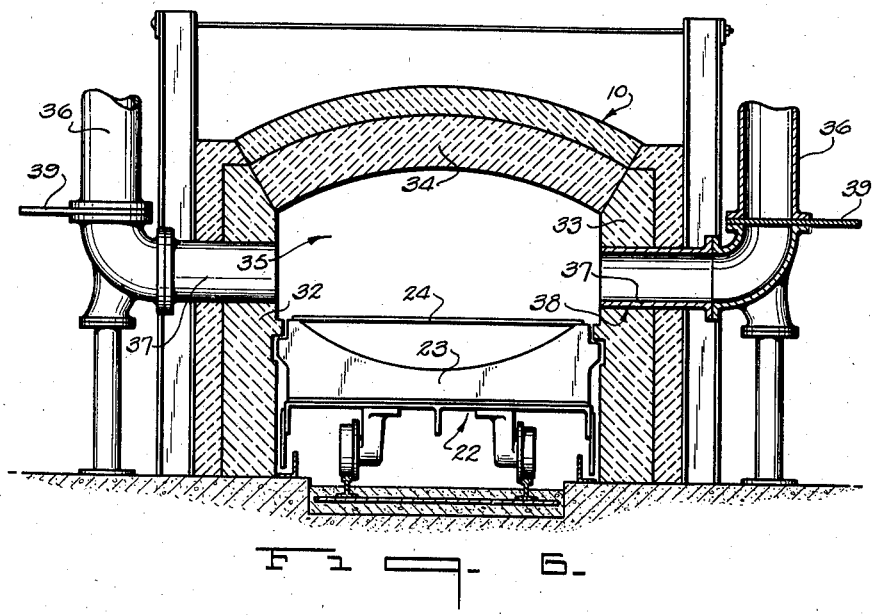
Figure 7:
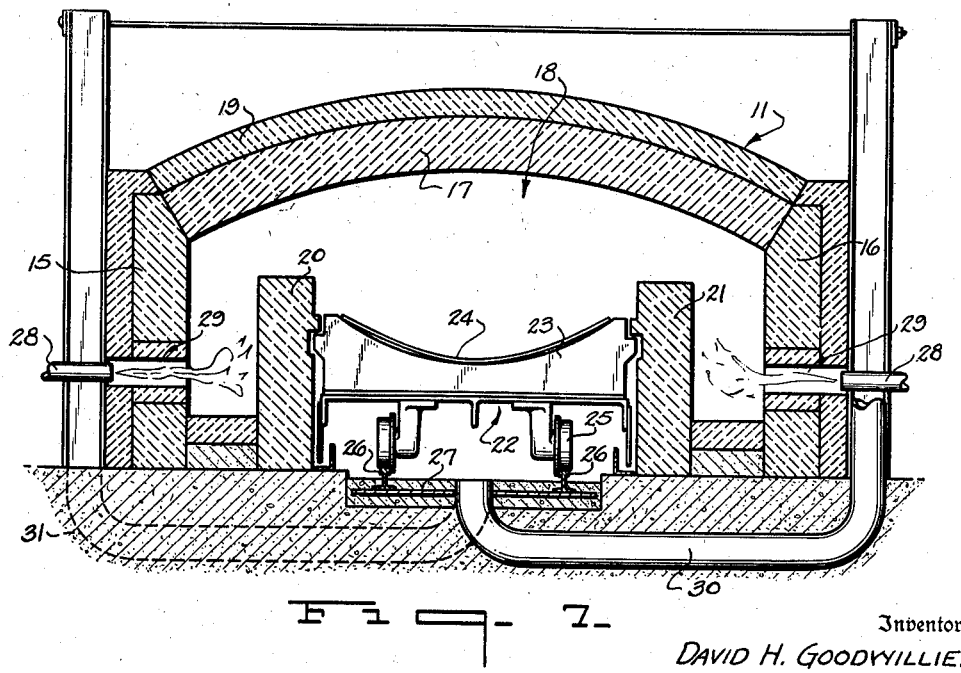

In the drawings wherein like numerals are employed to designate like parts throughout the same, Fig. 1 is a side elevation of a continuous bending furnace or oven constructed in accordance with the present invention, Fig. 2 is a plan view thereof, Fig. 3 is a vertical section taken substantially on line 3—3 of Fig. 1, Fig. 4 is a vertical section taken substantially on line 4—4 of Fig. 1, Fig. 5 is a vertical section taken substantially on line 5—5 of Fig. 1, Fig. 6 is a vertical section taken substantially on line 6—6 of Fig. 1, and Fig. 7 is a vertical section taken substantially on line 7—7 of Fig. 1.

Referring now to the drawings and especially to Figs. 1 and 2, the continuous bending furnace or oven illustrated therein is of tunnel-like formation and of considerable length, said furnace being divided longitudinally into a plurality of successive portions or sections 10, 11, 12, 13 and 14 respectively, said sections following one another from the intake end of the furnace to the outlet end thereof. The numeral 10 designates the preheating section in which the molds and blanks are adapted to be preheated or, in other words, gradually heated up to facilitate the subsequent bending operation. The numeral 11 designates the bending section wherein the blanks are subjected to a bending heat, the temperature within this section of the furnace being sufficiently high to cause the blanks to drop by their own weight into and take the shape of the molds as will be more fully hereinafter described. Following the bending section 11 are the cooling sections 12, 13 and 14 through which the molds are successively moved subsequent to the bending operation and in which the blanks are slowly annealed and cooled to avoid breakage thereof as well as minimize the setting up of stresses and strains therein.

Generally speaking, each section of the furnace comprises opposite side walls and a crown or roof cooperating to form a substantially closed tunnel chamber, with the chambers of the several sections being in alignment with and constituting substantial continuations of one another so that the cars or trucks carrying the molds and blanks can be passed in a substantially straight path therethrough.

With reference particularly to Fig. 7, the bending section 11 of the furnace comprises the spaced side walls 15 and 16 respectively and a crown 17 forming the tunnel chamber 18, said side walls and crown being preferably covered with a layer of suitable insulating material 19.

Arranged within the chamber 18 and extending longitudinally thereof are the spaced parallel partition walls 20 and 21 defining therebetween a way for the trucks or cars 22 upon which are supported the molds 23 carrying the glass blanks 24. The trucks 22 are mounted upon wheels 25 rolling along rails 26 extending longitudinally through the furnace and embedded within the cement floor 27.

The mold 23 is herein shown as being a concave mold but it will be readily appreciated that convex molds may also be employed. Likewise, that the molds may be of any preferred size and shape to give the desired curvature to the finished blanks. By using the proper form of mold, any desired type of curve, either simple or compound, can be formed.

The partition walls 20 and 21 are spaced from the side walls 15 and 16 respectively of the bending section and cooperate therewith to provide relatively narrow channels into which the gas flames for heating the furnace are adapted to be directed, the said channels communicating with the vault above the truck 22 by passageways formed between the crown 17 and the tops of the said partition walls 20 and 21. The heating flames are adapted to be introduced into the channels from a plurality of burners 28 arranged along each side of the bending section 11 and operating through openings 29 in the side walls 15 and 16. The partition walls 20 and 21 therefore serve to protect the trucks and molds from the direct action of the heating flames.

The bending section of the furnace is adapted to be heated to a relatively high temperature and in order to prevent the trucks 22 from being adversely affected by this intense heat, means is preferably provided for circulating a cooling medium beneath the said trucks to prevent overheating thereof. This is herein accomplished by the proviison of the conduits 30 and 31 communicating at their inner ends with the space beneath the said trucks. Relatively cool air can then be continuously circulated beneath the trucks, being introduced preferably into one end of the bending section 11 of the furnace through one conduit and withdrawn at the opposite end thereof through the other conduit.

A transverse sectional view through the preheating section 10 of the furnace is shown in Fig. 6 and upon reference thereto, it will be seen that this furnace section also comprises spaced side walls 32 and 33 and a crown 34 forming a chamber 35 through which the trucks 22 carrying the molds and blanks are passed. The preheating section 10, however, is preferably not quite as wide as the bending section 11 and the chamber 35 therein is of a width substantially equal to the width of the said trucks.

In order to effect the desired preheating of the molds and blanks as they are carried through the preheating section, means is provided for withdrawing a certain amount of the heat from the bending section 11 and utilizing this heat to carry out the preheating operation. To this end, there is arranged at desired locations along each side of the preheating section of the furnace a plurality of vertical stacks 36 which communicate with the chamber 35 by means of pipes 37 passing horizontally through openings 38 in the side walls 32 and 33 thereof. Associated with each stack is a horizontally slidable damper 39 and by properly adjusting these dampers to regulate the draft of the stacks, a draft will be created within the chamber 35 sufficient to withdraw a portion of the heat from the chamber 18 of the bending section 11 and cause it to flow longitudinally through the chamber 35 of the preheating section in a direction opposite to the direction of movement of the blanks therethrough. As a result, the temperature within the preheating chamber will increase gradually from the forward end thereof toward the bending section so that the blanks in passing therethrough will be gradually heated up.

As illustrated in Figs. 1 and 2, the bending section 11 of the furnace may be provided at the end thereof, remote from the preheating section 10, with a relatively narrower extension 40 and, if desired, there may be associated with this extension stacks 41, similar to stacks 36, in communication with the interior of the extension and serving to withdraw a portion of the heat from the bending section 11, thereby tending to counteract to some extent the withdrawal of the heat from said section by the action of the stacks 36 and resulting in more uniform temperature conditions within the said bending section.

As brought out hereinabove, after the molds and blanks leave the bending section 11 of the furnace, they are adapted to be carried successively through the cooling sections 12, 13 and 14 wherein the said blanks are properly annealed and cooled, so that upon leaving the furnace they may be readily handled. The first cooling section 12 comprises, as illustrated in Fig. 3, spaced side walls 41 and 42 and a substantially flat roof 43 defining the tunnel chamber 44, said side walls and roof being preferably covered with a layer of suitable insulating material 45. The cooling section 12 is preferably of substantially the same width as the preheating section 10.

The cooling section 13 (Fig. 4) comprises the spaced side walls 46 and 47 and a flat roof 48 defining a tunnel chamber 49 through which the blanks are carried. The layer of insulating material 45 covering the cooling section 12 is omitted from the cooling section 13. The final cooling section 14 is of substantially the same width as the cooling section 13 and comprises (Fig. 5) spaced side walls 50 and 51 and a roof 52 defining the tunnel chamber 53. The roof 52 is relatively thinner than the roof of the adjacent cooling section 13 and may be supported at a plurality of spaced points by transverse I-beams 54. By constructing the cooling sections 12, 13 and 14 of the furnace in the manner described above, it will be readily apparent that the insulating effect thereof is gradually decreased toward the exit end of the furnace, as a result of which the dissipation of heat from successive cooling sections will be increased so that the blanks will be gradually cooled as they pass therethrough and upon issuing from the furnace will be reduced to a temperature where they are set and can be readily handled.

In operation, the trucks 22 with the molds 23 thereon are periodically introduced into the receiving chamber 55 at the entrance end of the furnace and passed therefrom first into the preheating section 10 and thence successively through the bending section 11 and cooling sections 12, 13 and 14. The flat sheets or plates of glass 24 to be bent, and herein termed the blanks, are placed horizontally upon the tops of the molds as shown in Fig. 6. The trucks are then passed into and through the preheating section 10 wherein the said molds and likewise the blanks are gradually heated up to a temperature where they can be introduced into the bending section without undergoing any sudden shock which might tend to break or otherwise adversely affect the same. As brought out above, the preheating section 10 is heated by withdrawing a portion of the heat from the bending section 11 and the blanks are gradually increased in temperature as they pass through the preheating section, so that when they enter the bending section, the temperature thereof will be in the neighborhood of from 1175 to 1225 degrees Fahrenheit. The trucks carrying the blanks are preferably passed intermittently through the furnace, with the said trucks being permitted to remain in the same position for the desired length of time depending up the temperatures therein, the length of the furnace, etc.

The preheated blanks, upon entering the bending section 11, are adapted to be subjected to bending temperatures and when the blank reaches bending heat, the central portion thereof will sag or sink down into the mold by its own weight so that the curvature of the mold will be accurately imparted to the blank. This softening and settling down of the blank into the mold as it is contained within the bending section 11 will cause the said blank to be brought into contact with the mold throughout its entire area and the desired curvature imparted thereto. The temperature within the bending section will range from approximately 1225 to 1275 degrees Fahrenheit. The blanks, upon leaving the bending section, are carried successively through the cooling sections 12, 13 and 14 in the manner set forth above to anneal the same and reduce them to a handling temperature. As explained hereinabove, any desired type of curvature, either simple or compound, can be formed by using the proper mold. Also, that while a concave mold has been illustrated herein by way of example, convex molds can be employed if desired.

Although entirely satisfactory results can ordinarily be obtained simply by heat treating the blanks to cause them to drop by their own weight into and take the shape of the molds, yet in some instances and especially when compound curves are being formed, it has been found that the blanks, upon sinking into the molds, do not accurately fit the said molds throughout their entire areas. This condition is illustrated, by way of example, in Fig. 7. Therefore, in order to avoid this objectionable feature should it occur, the present invention contemplates the provision of means for effecting an additional positive mechanical pressing of the blanks into the molds to assure that the said blanks will be brought into intimate contact with the said molds throughout their entire areas.

This mechanical pressing is preferably performed upon the blank immediately upon its leaving the bending section 11, and to this end the roof 43 of the cooling section 12 is provided with a substantially rectangular opening 56 (Fig. 3), and adapted to operate through this opening is the vertically movable forming member or plunger 57, the bottom 58 thereof being of a curvature to conform with the curvature of the upper surface 59 of the mold 23. As each succeeding blank 24 is brought to a position beneath the plunger 57, it will be operated on by the said plunger to cause the said blank to assume the shape of the mold and plunger, thereby making sure that the blank will have exactly the same curvature as the mold.

Any suitable means may be provided for indexing the trucks carrying the molds through the furnace so that each truck will be brought to exact position beneath the plunger. If desired, adjacent trucks can be caused to abut one another end to end so that the introduction of one truck into the preheating section will cause all of the preceding trucks within the furnace to be moved along a distance exactly the length of one truck. Consequently, as one truck is introduced into the forward end of the furnace, another truck will be pushed from the exit end thereof.

Although there has been illustrated in the drawings and described hereinabove the bending of single sheets or plates of glass, it will of course be readily appreciated that two or more sheets or plates can be bent simultaneously by supporting them one upon the other upon the molds. The bending of the sheets in pairs is particularly desirable when they are to be subsequently bonded together with an interposed sheet of non-brittle material to form composite glass. The bending of the sheets in pairs insures that the two sheets will have the same curvature and thus reduces breaking of the glas incident to compositing to a minimum.

While certain temperatures have been mentioned hereinabove, it is to be understood that these have been given merely by way of example and that the temperatures in different portions of the furnace may be varied, depending upon the length of the furnace sections, thickness of the glass blanks, etc. Furthermore, the invention is not limited to the specific means disclosed for heating the bending section of the furnace.

It is also to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In an apparatus for bending flat or substantially flat blanks of glass, a continuous bending furnace of tunnel construction including a preheating section, a bending section, and a cooling section arranged in substantial alignment with and constituting substantial continuations of one another, molds for supporting the blanks to be bent, means for carrying the molds and blanks successively through said preheating, bending and cooling sections, said blanks being preheated within said preheating section and subsequently cooled in said cooling section, means for subjecting the blanks to a bending heat within said bending section, thereby causing the said blanks to drop by their own weight and take the shape of the molds, means associated with the said preheating section of the furnace for withdrawing a portion of the heat from the said bending section and utilizing it to effect the preheating operation, and a vertically movable plunger operating through an opening in the roof of the cooling section of the furnace for effecting a mechanical pressing of the said blanks as they leave the bending section to force them into intimate contact with the molds.

2. In an apparatus for bending flat or substantially flat blanks of glass, a continuous bending furnace of tunnel construction including a preheating section, a bending section, and a cooling section, molds for supporting the blanks to be bent, means for carrying the molds and blanks successively through said preheating, bending, and cooling sections, said blanks being preheated within said preheating section and subsequently cooled in said cooling section, means for subjecting the blanks to a bending heat within said bending section, thereby causing the said blanks to drop by their own weight and take the shape of the molds, and a vertically movable pressing member operating through an opening in the roof of the cooling section of the furnace for effecting a mechanical pressing of the said blanks as they leave the bending section to force them into intimate contact with the molds.

3. In an apparatus for bending flat or substantially flat blanks of glass to a predetermined curvature, a continuous tunnel furnace including a preheating portion, a bending portion, and a cooling portion arranged in substantial horizontal alignment, molds for supporting the blanks to be bent and having curved mold faces, means for passing the molds and blanks successively through said preheating, bending and cooling portions, said blanks being preheated within said preheating portion and subsequently cooled in said cooling portion, means for subjecting the blanks to a bending heat within said bending portion, thereby causing the said blanks to drop and take the shape of the molds, means communicating with the preheating portion for creating a draft within the bending portion whereby to withdraw a portion of the heat from said bending portion and cause it to flow longitudinally through said preheating portion in a direction opposite to the direction of movement of the molds and blanks therethrough, and means communicating with the bending portion at the end thereof remote from the preheating portion serving to create a draft in the said bending portion to counteract the withdrawal of the heat therefrom into the said preheating portion.

4. In an apparatus for bending flat or substantially flat blanks of glass to a predetermined curvature, a continuous tunnel furnace including a preheating portion, a bending portion, and a cooling portion arranged in substantial horizontal alignment, molds for supporting the blanks to be bent and having curved mold faces, means for passing the molds and blanks successively through said preheating, bending and cooling portions, said blanks being preheated within said preheating portion and subsequently cooled in said cooilng portion, means for subjecting the blanks to a bending heat within said bending portion, thereby causing the said blanks to drop and take the shape of the molds, means mounted in the forward end of the cooling portion for effecting a mechanical pressing of the said blanks subsequent to the bending thereof but while they are still in a highly heated condition to force them into intimate contact with the molds, means communicating with the preheating portion for creating a draft within the bending portion whereby to withdraw a portion of the heat from said bending portion and cause it to flow longitudinally through said preheating portion in a direction opposite to the direction of movement of the molds and blanks therethrough, and means communicating with the bending portion at the end thereof remote from the preheating portion serving to create a draft in the said bending portion to counteract the withdrawal of the heat therefrom into the said preheating portion.

DAVID H. GOODWILLIE.